United States Patent
Broda et al.

(10) Patent No.: US 10,001,181 B2
(45) Date of Patent: Jun. 19, 2018

(54) METHOD FOR PRODUCING A BRAKE DISK AND A BRAKE DISK

(71) Applicant: FORD GLOBAL TECHNOLOGIES, LLC, Dearborn, MI (US)

(72) Inventors: Maik Broda, Wuerselen (DE); Tomasz Pawel Grabiec, Bergisch Gladbach (DE); Clemens Maria Verpoort, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/806,306

(22) Filed: Jul. 22, 2015

(65) Prior Publication Data

US 2016/0025167 A1    Jan. 28, 2016

(30) Foreign Application Priority Data

Jul. 24, 2014  (DE) .......................... 10 2014 214 508

(51) Int. Cl.
*F16D 65/12*  (2006.01)
*C23C 4/08*  (2016.01)
(Continued)

(52) U.S. Cl.
CPC .............. *F16D 65/127* (2013.01); *C23C 4/02* (2013.01); *C23C 4/08* (2013.01); *C23C 4/18* (2013.01);
(Continued)

(58) Field of Classification Search
CPC ........... F16D 65/127; F16D 2250/0046; F16D 2250/0053; F16D 2250/0069; C23C 4/02;
(Continued)

(56) References Cited

U.S. PATENT DOCUMENTS 4,280,597 A * 7/1981 Schorwerth ........... B60T 17/221
                                                    188/218 XL
4,499,123 A * 2/1985 Suzuki .................... C23C 18/31
                                                    427/282
(Continued)

FOREIGN PATENT DOCUMENTS

DE        4122763 A1    1/1993
DE       10306919 A1    9/2004
(Continued)

OTHER PUBLICATIONS

Polymet's Blog on Spray Coatings http://blog.polymet.us/arc-spray-wire-2/wire-arc-spray-coatings-for-the-protection-of-boiler-tubes/ Publication/Post date: Sep. 28, 2012.*

*Primary Examiner* — Melody M Burch
(74) *Attorney, Agent, or Firm* — Maria Johnston; Brooks Kushman P.C.

(57) ABSTRACT

The disclosure relates to a brake disk and a method for producing a brake disk. The method may include roughening at least some area(s) of a surface of the main body, forming a metal coating on at least some area(s) of the roughened region of the surface of the main body, applying an enamel slip to at least some area(s) of the surface of the main body, drying the applied enamel slip, and heating the main body to form the enamel coating and to join the metal coating metallurgically to the main body. The brake disk may include a main body having an enamel coating arranged at least in some area(s). A metal coating may additionally be formed on the surface of the main body, at least in some area(s), wherein the metal coating is joined metallurgically to the main body.

20 Claims, 3 Drawing Sheets

(51) Int. Cl.
*C23C 4/02* (2006.01)
*C23C 4/18* (2006.01)
*C23F 17/00* (2006.01)

(52) U.S. Cl.
CPC ............... *F16D 2250/0046* (2013.01); *F16D 2250/0053* (2013.01)

(58) Field of Classification Search
CPC .... C23C 4/08; C23C 4/18; C23D 5/02; C23D 7/00; C23F 17/00
See application file for complete search history.

(56) References Cited

U.S. PATENT DOCUMENTS

| | | | | |
|---|---|---|---|---|
| 4,959,256 | A | * | 9/1990 | Piera ..................... A47J 36/02 220/62.11 |
| 5,407,035 | A | * | 4/1995 | Cole ......................... C23C 4/18 188/218 XL |
| 6,933,012 | B2 | * | 8/2005 | Das ......................... C23C 10/08 427/252 |
| 2004/0031652 | A1 | * | 2/2004 | Khambekar .......... F16D 65/127 188/218 XL |
| 2007/0286961 | A1 | * | 12/2007 | Pahle ...................... C23C 4/02 427/449 |
| 2011/0221152 | A1 | * | 9/2011 | Scheckelhoff ........ B60T 17/083 280/124.11 |
| 2012/0321812 | A1 | * | 12/2012 | Vanek ..................... C23C 4/131 427/449 |
| 2013/0333989 | A1 | * | 12/2013 | Oezer ................... F16D 65/127 188/218 XL |
| 2014/0234609 | A1 | * | 8/2014 | Reisel ..................... C22C 29/08 428/312.8 |

FOREIGN PATENT DOCUMENTS

| | | |
|---|---|---|
| DE | 102005008569 A1 | 10/2006 |
| DE | 102005022264 A1 | 11/2006 |
| DE | 102006050985 A1 | 4/2008 |
| DE | 102008035849 A1 | 2/2010 |
| DE | 102009003161 A1 | 11/2010 |
| DE | 102013221737 A1 | 4/2015 |
| FR | 2560798 A1 * | 9/1985 |
| WO | WO-2012168139 A1 * | 12/2012 |

* cited by examiner

METHOD FOR PRODUCING A BRAKE DISK AND A BRAKE DISK

CROSS-REFERENCE TO RELATED APPLICATIONS

This application claims foreign priority benefits under 35 U.S.C. § 119(a)-(d) to DE 10 2014 214 508.2 filed Jul. 24, 2014, which is hereby incorporated by reference in its entirety.

TECHNICAL FIELD

The present disclosure relates to a method for producing a brake disk for a vehicle and to a brake disk for a vehicle.

BACKGROUND

On vehicles, especially motor vehicles, disk brakes form probably the most widely used type of brake system. Disk brakes are composed essentially of a brake disk and of a brake caliper which fits around the edge of the brake disk. In this arrangement, the brake disk is connected to the vehicle wheel to be braked by a wheel hub supported rotatably in the axle stub. In contrast, the brake caliper is fixed on the axle stub. The actual deceleration is achieved by means of brake pads, which can be placed against the brake disk and which are arranged on both sides of the brake disk, between the latter and the brake caliper.

Depending on the application, brake disks can be composed either of iron or, alternatively, of carbon-ceramic or aluminum. Although brake disks produced from iron, more specifically from gray cast iron, are very widely used, they have the known problem of surface rust. Moreover, there is sometimes a damaging effect in combination with aluminum rims, into the surface of which the hot iron particles which become detached during the braking process can burn to a significant extent.

Overall, brake disks should have a braking surface which shows as little wear as possible and releases little fine dust. To achieve this, the aim is to make the surface as hard as possible. Thus, in the case of aluminum brake disks, for example, silicon carbide (SiC) may be added, this being deposited as a wear-resistant protective layer on the surface. However, the production of brake disks from non-ferrous materials is in some cases difficult and generally expensive.

Another embodiment of such a protective layer can be achieved using thermal spraying. In this case, the material to be applied to the surface of a main body of the brake disk is softened in advance by the action of heat and is accelerated in the form of individual particles by means of a gas stream. When the particles make contact, a purely mechanical bond (e.g., without fusion of the surface of the main body) is formed. The materials can be metals as well as oxide-ceramic or carbide materials. Apart from high costs, the disadvantage here is especially the durability of such protective layers. Thus, only moderate roughening of the surface by means of sand blasting, especially corundum blasting, is generally possible, but this does not lead to a durable mechanical bond. For example, when using hard gray cast iron for the main body, dovetail roughening, an advantageous roughening process, is not possible.

In a previous application originating from the Applicant, DE 10 2013 221 737.4, a method for producing a brake disk which envisages the arrangement of an oxidic enamel coating on the friction surfaces thereof is disclosed. This coating is baked into the base material of the brake disk in order to achieve a metallurgical bond through phase formation. In its arrangement, the enamel coating serves as an antiwear and anticorrosion layer. However, it should be noted here that the thermal stress on brake disks protected in this way is limited. The reason for this is the glass transition temperature of oxidic enamel coatings of approximately 650° C. If corresponding temperatures are reached by demanding braking operations, said enamel coating can begin to creep and/or to flow. This is due essentially to the high surface pressure of the brake linings coming into contact with the friction surfaces combined with simultaneous softening of the enamel coating.

Thus, it is known that brake disk temperatures caused by braking processes can easily reach a level of 700° C. Current brake disks must generally pass the "Auto-Motor-Sport Test" (AMS). This specifies 10 braking cycles in quick succession, in which a vehicle fitted with the brake disks to be tested is alternately accelerated to 115 km/h and then braked to a halt with a maximum braking force.

DE 10 2005 022 264 A1 and the DE 10 2006 050 985 A1 disclose the possibility of forming a NiCrBSi coating on a steel substrate. For this purpose, mixing the metallic powder with an aqueous enamel slip is proposed, wherein the mixture formed is applied to the surface of the substrate by spraying or immersion, for example. During the subsequent drying process, the water component of the mixture is removed, whereupon the substrate thus prepared is heated to 1040° C. to 1060° C. The sintering of the mixture which is brought about in this way can be accomplished either in a furnace or by open flaming or by means of induction coils. In contrast to other coating methods by simple application, it is essential here that a metallurgical bond should be formed between the coating and the surface of the substrate. This gives a kind of welded joint which, in contrast to otherwise conventional spray coatings, does not allow sub-surface corrosion damage.

However, the coating disclosed by the abovementioned publications must be critically considered in connection with brake disks since there are justified reservations relating to health regarding the nickel dust (fine dust) which is released during braking. Thus, such a coating, which would otherwise be advantageous, is unsuitable for brake disks.

Other methods known in the prior art generally envisage the formation of an oxide layer on the surface of the respective component, which may be advantageous. This contributes to an increase in wear resistance and provides cathodic protection from further corrosion. For this purpose, the material of the component itself is subjected to a suitable procedure by means of which the desired oxide layer can be formed on the base material.

Since brake disks are mass-produced wearing parts, they are predominantly manufactured from iron, especially gray cast iron. However, the formation of iron oxide tends to be unwanted here. This is because the formation of an iron-based oxide involves a corrosive process which destroys the brake disk over time. Apart from the deterioration in appearance due to even slight superficial rust, this quite often leads to an acoustic deterioration which manifests itself in unpleasant squealing.

The previously known coatings based on electrolytic or spraying methods do not currently allow the possibility of producing permanently wear- and corrosion-resistant brake disks, especially gray cast iron brake disks. This also applies to the desired optimum friction coefficients of said brake disks for adequate deceleration. Given the prior art cited, there is still plenty of room for improvement in the manufacture of mass-produced brake disks which are more durable overall.

Given this background situation, it is the underlying object of the disclosure to present a method for producing a brake disk and a brake disk for a vehicle which allows low-cost manufacture that is easy to integrate into existing processes, wherein the brake disk itself meets all the requirements for the reliable functioning thereof over a long period of time.

SUMMARY

In at least one embodiment, a method for producing a brake disk is provided. In further embodiments, a brake disk is provided, which may be produced according to the disclosed methods. Further particularly advantageous embodiments of the disclosure are also disclosed.

It should be noted that the features and measures presented individually in the following description can be combined in any technically meaningful way and give rise to further embodiments of the disclosure. The description additionally characterizes and specifies the invention, especially in conjunction with the figures.

According to the disclosure, a method for producing a brake disk for a vehicle, in which an enamel coating is formed on a main body of the brake disk, is disclosed below.

According to the disclosure, the method may include at least the following steps:

roughening at least some area or areas of a surface of the main body, forming a metal coating on at least some area or areas of the roughened region of the surface of the main body, applying an enamel slip to at least some area or areas of the surface of the main body, drying the applied enamel slip, heating the main body provided with the metal coating and the dried enamel slip to form the enamel coating and to join the metal coating metallurgically to the main body.

The resulting advantage lies in the combination of the advantageous properties of the metal coating with those of the enamel coating. Here, the metal coating may serve as an antiwear coating, while the enamel coating acts as an anticorrosion coating. It should be mentioned here that the metal coating likewise simultaneously serves as an anticorrosion coating, since it reliably prevents any rusting of the main body. Thus, both visual deterioration and also deterioration leading to noise (grind-noise reduction) can be reliably reduced or eliminated thanks to a lack of susceptibility to rusting, even after a prolonged service life.

In one embodiment, the metal coating can be an alloy based on Fe or FeCr. The metal coating can furthermore also be formed by a FeCrMn steel.

In another embodiment, the metal coating may be a FeCrBSi coating. A FeCrBSi coating of this kind can be a "self-flowing" alloy. The properties thereof ensure melting and compaction by liquid-phase sintering when the melting point is reached. The melting point thereof then rises further since the element(s) which lower the melting point, e.g. silicon (Si), is/are distributed and/or diluted by diffusion.

As a result, a corrosion-resistant and/or wear-resistant layer or coating is formed by the metal coating, the adhesion of which on the main body is significantly improved by the metallurgical bonding thereof. In this way, any undermining of the metal coating, e.g. by subsurface corrosion, is reliably prevented.

The quality of the metal coating can also simultaneously be improved by the heating (sintering) of the enamel slip—at a temperature of 840° C. for 10 to 20 minutes, for example. In this way, the main body can be brought to a constant annealing temperature, wherein the enamel slip melts and bonds to the surface of the main body manufactured from cast iron. The observed result is that the adhesive strength and layer quality of the coatings are significantly improved by the heating process. Thus, any separation or flaking, especially of the enamel coating, during operation can be reliably prevented.

Depending on requirements, the enamel slip used can be one which has a melting point corresponding to the desired sintering temperature.

As used in the present disclosure, a slip or enamel slip may mean the starting material for the enamel coating to be applied. In this context, it may be a body in the form of a mixture of minerals which has a liquid, slurry-like or viscous consistency and is applied in a suitable manner to the roughened part or parts of the top region.

In respect of the use of an application means, a contact method or a contactless method is conceivable for application, for example. Thus, the enamel slip can be applied with the aid of an application roller or application brush, for example. Moreover, application can be accomplished by spraying, in particular by airless spraying, for example. If appropriate, at least partial immersion of the main body into the enamel slip is also conceivable.

In one embodiment, the arrangement of the metal coating can extend at least onto the friction surfaces of the friction ring of the brake disk which face away from one another or can be reduced thereto. The friction surfaces are those annular surfaces of the main body which are intended to be in contact with the brake linings that can be placed against them. Thus, the roughened region or regions of the surface of the main body can be limited to those parts which are to be provided with the metal coating. By virtue of the metal coating, there is no abrasion prejudicial to health as regards the release of nickel already discussed above. By means of the anticorrosion and antiwear action of the metal coating, it is now possible to achieve long service lives for a brake disk produced in this way.

Regarding the enamel coating, this can preferably extend onto parts of the main body which are not provided with the metal coating. Thus, the particular advantage of the enamel coating acting as corrosion protection lies in its ability to reach even regions of the main body which are not directly accessible. This is advantageous especially in the case of ventilated, in particular internally ventilated, brake disks. Brake disks of this kind normally have two outer disks, spaced apart in parallel, on each of which one of the friction surfaces is arranged. In this arrangement, the outer disks are connected to one another by ribs extending between them. A large surface area of the main body is thereby produced so as to dissipate the heat produced during braking to the environment.

Here, the enamel slip can easily wet the regions between the outer disks and the ribs by virtue of its fluid, preferably watery, consistency. The subsequent heating therefore enables the advantageous enamel coating to be formed as corrosion protection in these regions, which are otherwise not directly accessible.

The enamel slip can furthermore be applied in the transitional region between the friction ring and the projecting connecting surface (hat) of the main body. Here, the enamel slip can be applied without any masking of the surface of the main body, and it is therefore quite possible for an overlap, several millimeters in width for example, to form between the enamel coating and the metal coating on the friction surfaces.

According to an advantageous development of the basic concept of the disclosure, the metal coating can be formed by a thermal coating method. In one embodiment, a high-velocity flame spraying process (HVOF) can be used for this purpose. In this process, a suitable coating powder, e.g. a FeCrBSi powder, can be applied at high velocity to form a thin layer on the surface regions of the main body which are to be coated.

As an alternative or in addition, the thermal spraying method can also be plasma spraying, flame powder spraying or a wire arc spraying method, for example. As compared with the application methods which generally take place with powder, appropriate fillers in wire form can be used in the latter method.

The disclosure furthermore envisages that the metal coating is formed in a layer thickness of from 150 μm to 350 μm. The layer thickness to be selected is a matter for the person skilled in the art concerned, who will tend to select a greater layer thickness, based on the possibility of finish machining of the metal coating, for example. Thus, the layer thickness can be 150 μm, for example, if there is no intention to carry out any further surface machining. In contrast, the layer thickness can be up to 350 μm if the metal coating is to be subjected to subsequent finish machining in order to adapt and/or improve the surface finish thereof.

According to one embodiment, it is possible, in order to roughen the main body, to introduce an anchoring thread into the surface region thereof which is to be coated. An anchoring thread is taken to mean a structure which is cut into the surface, allowing anchoring of the coating(s) to be formed. As an alternative, or in addition, the surface region to be coated can be pretreated by means of sandblasting. Corundum blasting may be used for this purpose in order to appropriately activate the surface of the main body. In either case, the surface treatment of the main body may serve to improve the bond between the coating(s) and the main body.

The disclosed methods envisage that the drying of the applied enamel slip can be carried out in a furnace. In this way, the drying process and hence the production process overall can be accelerated. Moreover, the ability to control drying in this way enables drying times to be precisely defined and precisely coordinated in time with the other measures. In one embodiment, drying can be carried out at a temperature of 90° C.

According to another embodiment, the heating of the main body provided with the metal coating and the dried enamel slip can be carried out in a temperature range of from 800° C. to 900° C. Heating can be carried out in a suitable furnace, for example. It is furthermore advantageously possible for heating to be carried out using a protective gas. Heating under a protective gas is an effective means of preventing the formation of scale and oxidation layers in this temperature range. As an alternative, or in addition, heating can be performed by means of one or more induction coils.

The sintering of a coating, e.g. a coating of FeCrBSi, would normally have to be performed at approximately 1120° C. However, this would involve an increase in scale formation on uncoated surface regions and, at the same time, a sharp drop in the material strength of the metallic main body of the brake disk. As a result, unacceptable deformations of the main body would occur, and these could only be compensated for by complex and correspondingly expensive finishing operations.

It is here that the disclosed invention exploits the surprising insight that, although the layer of FeCrBSi, for example, does not exhibit a transition to liquid phase sintering in the desired temperature range of 800° C. to 900° C., it already exhibits significantly improved adhesion on the surface of the main body. This is due to the diffusion processes which may occur in this temperature range, which enable the adhesion to be raised from, typically, 40 MPa to over 70 MPa. Moreover, there is already incipient sintering of the layer of FeCrBSi at these temperatures.

As already mentioned in relation to the possible layer thickness of the metal coating, one preferred possibility is for a mechanical finishing operation which is to be carried out to take place after the formation of said coating. It is thereby possible to achieve extremely high dimensional accuracy in the final dimensions of the brake disk.

By means of the hybrid coating method now presented, it is possible to produce brake disks with a long service life, which should be sufficient for more than 240,000 km on the road. Here, it is particularly the use of the hybrid coating method indicated which combines the advantageous properties of the metal coating and those of the enamel coating. As a result, non-rusting brake disks of cast iron are produced which furthermore have high resistance to wear.

The disclosure is furthermore also directed to a brake disk which is produced, in particular, by the method explained above. Statements below referring to the brake disk according to the disclosure should accordingly be seen in relationship to the method according to the disclosure, thus fundamentally allowing the features of the latter to be combined with those of the brake disk described below.

The brake disk under consideration may be a brake disk for a vehicle, in particular for a motor vehicle. The brake disk comprises a main body, on which an enamel coating is formed, at least in some area or areas. In one embodiment, the main body can be formed from cast iron. According to the disclosure, in addition to the enamel coating, a further coating is formed on at least one or more regions of the surface of the main body. According to the disclosure, said coating is a metal coating which is joined metallurgically to the main body.

The advantages obtained from the above-indicated brake disk according to the disclosure and the features described below have already been explained above in connection with the method according to the disclosure and apply in corresponding fashion to the brake disk according to the disclosure. For this reason, attention is in this respect drawn at this point to the above statements.

In respect of the composition of the enamel coating, this can be composed, for example, of at least one glass-forming oxide together with at least one further component and, if required, additionally at least one opacifier.

The glass-forming oxide may include at least one of the following, for example: silicon dioxide ($SiO_2$), boron trioxide ($B_2O_3$), sodium oxide ($Na_2O$), potassium oxide ($K_2O$), or aluminum oxide ($Al_2O_3$).

Of course, this list is not exhaustive, and therefore other glass-forming oxides are also conceivable.

Regarding the at least one further component, this can come from the following group, for example: borax, feldspar, quartz, fluoride, sodium carbonate, or sodium nitrate.

In this case too, this list is not exhaustive, and therefore further components are also conceivable.

Regarding the addition of at least one opacifier, if required, this can be selected from the following group, for example: titanium (Ti), zirconium (Zr), or molybdenum (Mo).

This is likewise not an exhaustive list, and therefore other opacifiers, such as tin oxide or titanium silicate, are also conceivable.

The enamel coating according to the disclosure may be a melting mixture. At the enamel temperature, the glass-forming oxides fuse to form a glass melt. Base enamels contain about 23-34% by weight of borax, 28-52% by weight of feldspar, 5-20% by weight of quartz, about 5% by weight of fluoride, with the rest being sodium carbonate and sodium nitrate. As already mentioned, the oxides of Ti, Zr and Mo can be used as opacifiers.

Ceramic pigments, such as iron oxides, chromium oxides and spinels, can also be included.

In order to improve adhesion on the metallic substrate of the main body, the enamel coating according to the disclosure can furthermore also contain at least one oxide from the following group, for example: cobalt oxide, manganese oxide, or nickel oxide.

In one embodiment, the substances mentioned are finely ground and melted. The melt is quenched, e.g. preferably added to water, and the granular glass-type frit formed is then finely ground again in the next step. During the grinding process, 30% to 40% of water together with clay and quartz powder are added. Depending on the type of enamel, the opacifiers and pigment oxides mentioned are also added.

In this way, an enamel slip is formed, which should be rested for some time, such as for a few days, to give a better mixture before the enamel slip is subsequently used. Suitable suspending agents may be used to ensure that a uniform layer thickness is obtained.

An advantageous development of the brake disk according to the disclosure envisages that the metal coating has an adhesive strength of greater than 70 MPa in relation to the surface of the main body.

According to one development, the metal coating can be formed at least on friction surfaces of a friction ring of the main body which face away from one another. In contrast, the enamel coating may be formed in the transitional region between the friction ring and the projecting connecting surface (hat) of the main body. It is quite conceivable here for the enamel coating to have an overlap with a width of a few millimeters, for example, in the direction of the metal coating on the friction surfaces. Moreover, the enamel coating can also be arranged on the projecting connecting surface.

Particularly in the case of ventilated brake disks with two outer disks spaced apart by means of ribs, it is envisaged that the enamel coating can be arranged in the regions between the outer disks and the ribs, with the result that the inner region is provided with the enamel coating.

Further advantageous details and effects of the disclosure are explained in greater detail below by means of different illustrative embodiments shown in the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
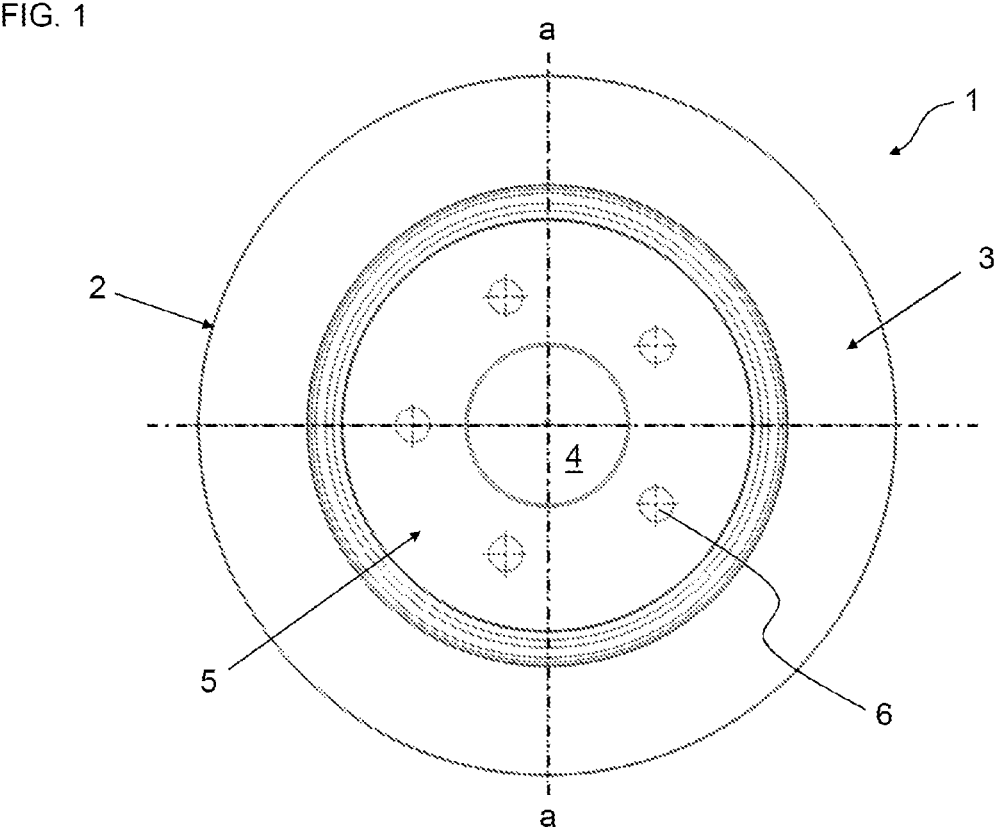
FIG. 1 shows a schematic illustration of a brake disk in elevation, according to an embodiment.

FIG. 1 shows a schematic illustration of a brake disk 1 according to the disclosure. It has a circular main body 2 made from cast iron. The main body 2 may have an encircling outer friction ring 3, which is provided for contact with at least one brake pad (not shown specifically) of a brake caliper. Provided in the center of the main body 2 is an opening 4, which is arranged in a projection 5 (hat) of the main body 2. Arranged around the opening 4, at uniform intervals, there are in the present case five through holes 6 through the projection 5. Said through holes 6 serve to receive wheel bolts (not shown specifically here), by means of which the brake disk 1 together with a wheel (not shown) can be connected to a wheel hub (likewise not shown).

With reference to the illustration in FIG. 1, a plane a-a divides the brake disk 1 in the vertical direction thereof, wherein FIG. 2, which is described below, shows the view of a section through said plane a-a.

Figure 2:
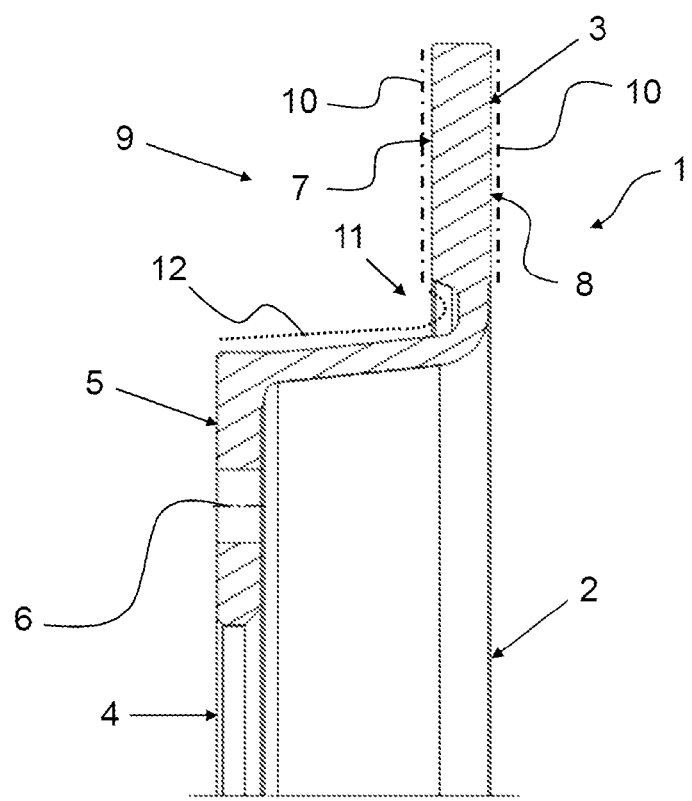
FIG. 2 shows a partial section through the brake disk according to the embodiment from FIG. 1 in a vertical direction.

FIG. 2 shows a section through the plane a-a of the brake disk 1 from FIG. 1. As can be seen in this illustration, the projection 5 projects relative to the friction ring 3 of the main body 2. The friction ring 3 comprises two friction surfaces 7, 8, which are aligned parallel to one another and face away from one another. They include a first friction surface 7 and a second friction surface 8. A metal coating 10 is formed on the friction ring 3 on a surface 9 of the main body 2, in the region of the two friction surfaces 7, 8. This coating can be a FeCrBSi coating, for example. In the present case, the metal coating 10 is indicated as a chain-dotted line. An enamel coating 12 is furthermore formed in a transitional region 11 between the friction ring 3 and the protruding projection 5 of the main body 2. In the present case, the enamel coating 12 is indicated by a dotted line. Of course, the enamel coating 12 can also be arranged in a continuous manner or discontinuously on the projection 5. Of course, it is possible to provide the enamel coating 12 on both sides of the brake disk, i.e. on the inside and on the outside in said regions.

Figure 3:
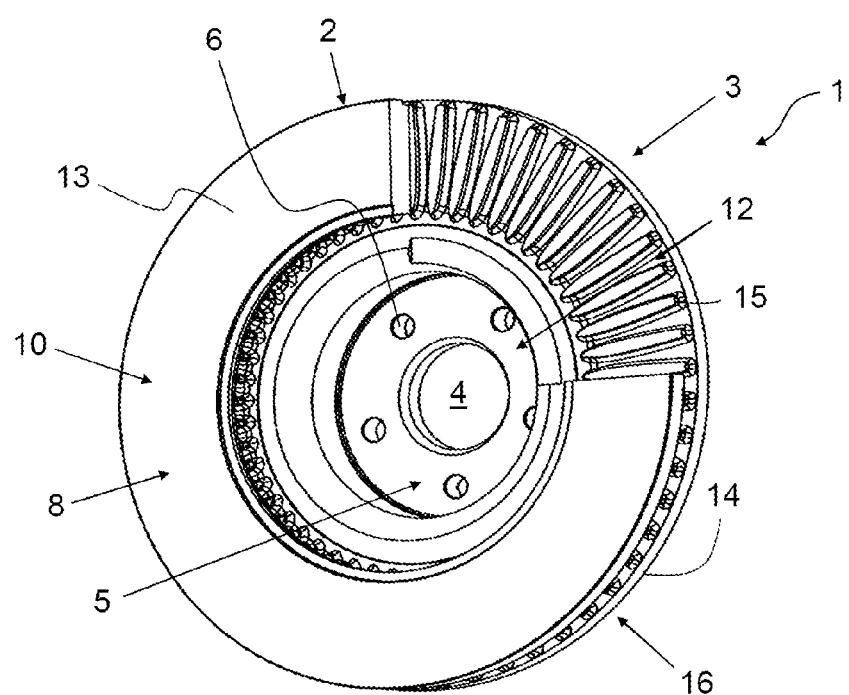
FIG. 3 shows another embodiment of the brake disk from FIGS. 1 and 2 in a perspective view.

FIG. 3 shows an alternative embodiment of the brake disk from FIGS. 1 and 2 in the form of a ventilated, more specifically an internally ventilated, brake disk 1. As can be seen, the main body 2 here has two outer disks 13, 14 extending parallel to one another, between which individual ribs 15 extend. Here, the ribs 15 serve to connect the two outer disks 13, 14 to one another and, at the same time, to space them apart. For this purpose, the ribs 15 are all likewise spaced apart and aligned radially with respect to the opening 4 of the projection 5. Spacing apart the two outer disks 13, 14 and the ribs 15 produces a multiplicity of radially extending cooling channels 16. In this embodiment, it is envisaged that the enamel coating 12 is also formed between the outer disks 13, 14 and the ribs 15, so that it wets the boundaries of the individual cooling channels 16.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method comprising:
   roughening an area of a friction surface of a brake disk;
   forming a metal coating having inner and outer edges on the roughened area;
   applying an enamel slip to a transitional region of the brake disk between the metal coating inner edge and an inner opening of the brake disk;
   drying the applied enamel slip; and
   heating the dried enamel slip to form an exposed enamel coating.

2. The method of claim 1, wherein the metal coating is formed by a thermal spraying method.

3. The method of claim 1, wherein the metal coating is formed in a layer thickness of from 150 µm to 350 µm.

4. The method of claim 1, wherein an anchoring thread is introduced into the friction surface.

5. The method of claim 1, wherein the drying of the applied enamel slip is carried out in a furnace at 90° C.

6. The method of claim 1, wherein the heating of the dried enamel slip is carried out in a temperature range of from 800° C. to 900° C. using a protective gas.

7. The method of claim 1, wherein the metal coating is finished mechanically.

8. The method of claim 1, wherein the metal coating includes an alloy of Fe or FeCr.

9. The method of claim 1, wherein the metal coating includes FeCrBSi.

10. The method of claim 1, wherein heating step is carried out at a melting point temperature of the enamel slip.

11. The method of claim 1, wherein the metal coating is formed by a high-velocity flame spraying process.

12. A vehicle brake disk comprising:
    a cast iron main body having a friction surface including a roughened area;
    a metal coating having inner and outer edges and formed on the roughened area and metallurgically joined to the roughened area; and
    an exposed enamel coating formed on a transition region of the cast iron main body between the metal coating inner edge and an inner opening of the cast iron main body.

13. The brake disk of claim 12, wherein the metal coating has an adhesive strength of greater than 70 MPa in relation to the roughened area.

14. The brake disk of claim 12, wherein the metal coating is formed of FeCrBSi.

15. The method of claim 1, wherein the friction surface is pretreated by corundum blasting in order to rough the area of the friction surface.

16. The method of claim 1, wherein the metal coating is formed directly on the roughened area.

17. The method of claim 1, wherein the exposed enamel coating is formed on a hat of the brake disk main body.

18. The method of claim 12, wherein the transition region is on a hat of the brake disk.

19. The method of claim 12, wherein the metal coating includes an alloy of Fe or FeCr.

20. The method of claim 12, wherein the metal coating is formed in a layer thickness of from 150 µm to 350 µm.

* * * * *